United States Patent [19]

Anderson

[11] Patent Number: 4,465,423

[45] Date of Patent: Aug. 14, 1984

[54] OUTBOARD MOTOR HANDLING AND STORING DEVICE

[75] Inventor: Milan B. Anderson, Chula Vista, Calif.

[73] Assignee: Recreation Industries Company, Oak Grove, Oreg.

[21] Appl. No.: 376,700

[22] Filed: May 10, 1982

[51] Int. Cl.³ .............................................. B60P 1/00
[52] U.S. Cl. ...................................... 414/462; 410/2; 224/310
[58] Field of Search ................ 414/462, 522; 224/310, 224/311, 321; 440/53, 62, 63; 410/2, 46, 97

[56] References Cited

U.S. PATENT DOCUMENTS

| | | | |
|---|---|---|---|
| 2,091,071 | 8/1937 | Girl | 414/522 X |
| 2,746,627 | 5/1956 | White | 414/462 |
| 3,039,634 | 6/1962 | Hobson et al. | 414/462 |
| 3,229,838 | 1/1966 | Johnson | 414/462 |
| 4,081,095 | 3/1978 | Wilburn et al. | 414/522 X |

*Primary Examiner*—Leslie J. Paperner
*Assistant Examiner*—David A. Bucci
*Attorney, Agent, or Firm*—Frank D. Gilliam

[57] ABSTRACT

An outboard boat motor handling and storing apparatus which may be mounted in the back of a vehicle, i.e., pickup truck, van, sportwagon, etc. for the field handling, transporting and storing of an outboard motor. The apparatus comprises an elongated member which is mounted for translation between a stowed position within the confines of the vehicle to a deployed position where it extends beyond the confines of the bed of the vehicle and the lowered tail gate if the vehicle is a pickup truck; and motor attachment member which is attached to and rotates longitudinally relative to the elongated member, the attachment includes a base which pivots vertically relative to the elongated member attachment. With the elongated member in a deployed position, the motor is attached to the base, which is positioned perpendicular relative to the elongated member; the base member is then pivoted substantially parallel with that elongated member, and the motor attachment member is then rotated approximately 180°, positioning the motor along the elongated member. The motor is then secured to the elongated member at a second location. Various locks are included to prevent movement of the motor when stored.

12 Claims, 4 Drawing Figures

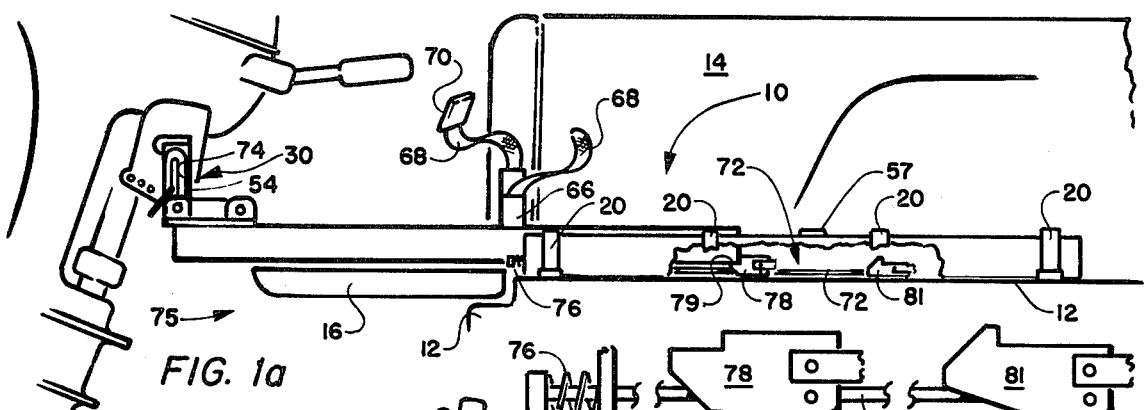
FIG. 1a
FIG. 1b
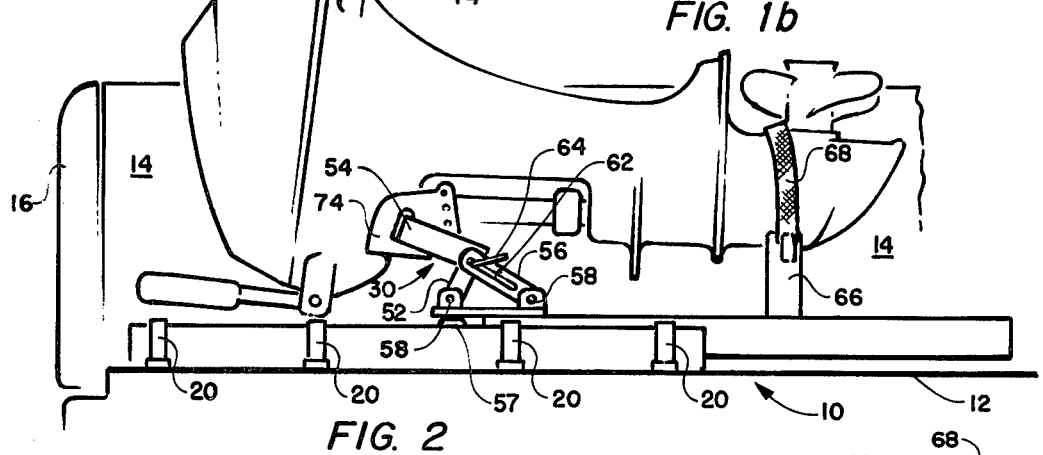
FIG. 2
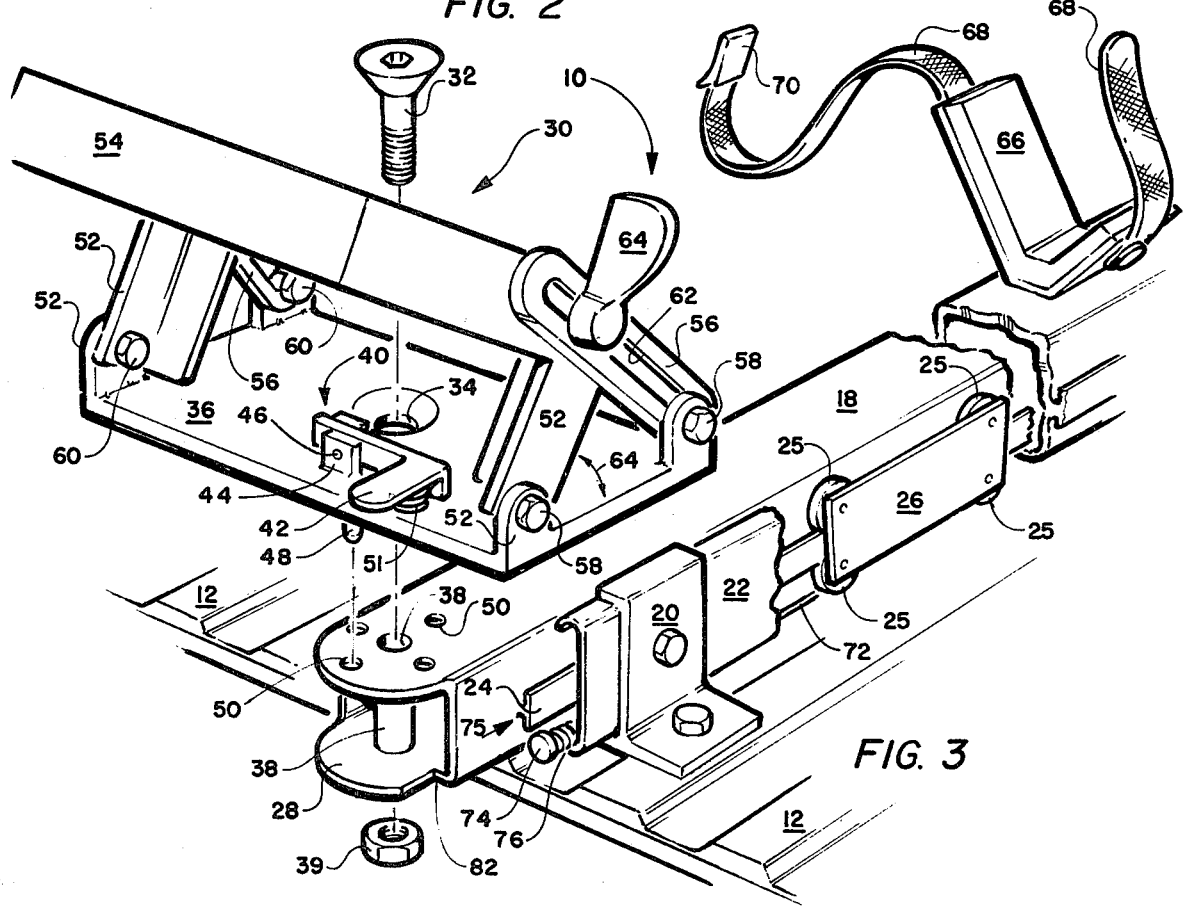
FIG. 3

OUTBOARD MOTOR HANDLING AND STORING DEVICE

BACKGROUND OF THE INVENTION

1. Field of Invention

The invention relates to outboard boat engine handling and storing and more particularly to an apparatus to which an outboard boat motor can be easily attached and stored by a person alone.

2. Prior Art

The use of outboard motors for recreational boating and also for some commercial boat applications has become so widespread that outboard motor units probably outnumber all other types of marine power units in the world. In the United States alone, there are several million outboard motors used by their owners for recreational purposes only.

One of the features of outboard motors which accounts for their popularity has been portability. The motor can be transported separately from the hull and both can be transported to a launching site. Unfortunately, outboard motors have grown in both weight and horsepower, so that the most popular motors currently in use weigh over sixty pounds, a weight which the average office worker or older man finds rather excessive for handling and transporting, specifically in the rear of an enclosed vehicle, such as a pickup truck.

It has been convenient for sportsmen to separate their boats and outboard motors for transporting. It is generally preferable to separate the motor from the boat during transporting to either protect the motor from theft and damage or, in some instances, the boat is stored on the roof of a vehicle, which requires that the motor be stored elsewhere than attached to the boat.

Storing the motor requires removal from the boat, generally by a person working alone, carried to the vehicle, lifted horizontally into position for storage and then secured in place to prevent movement during transport. Even in the event more than one person is available for this task, because of space it is impossible for more than one person to handle the motor when placing it in the back of a covered pickup truck or the like.

Serious physical injuries have resulted from a person moving an outboard boat motor horizontally while in a crouched position.

Examples of hand operated carts to accomplish outboard motor transport can be found in U.S. Pat. Nos. 2,745,673; 2,884,257; and 3,241,852. The examples of handling devices could not be successfully utilized for storing the motor within an automotive vehicle.

SUMMARY OF THE INVENTION

The invention is directed to a handling and storing apparatus for an outboard motor which can be conveniently mounted in the rear bed of a pickup truck, van or the like. The device is equipped to extend from the rear of the vehicle from a vehicle confined stored position sufficiently to enable an outboard motor to be transferred from a boat thereto without substantially elevating or lowering the vertical position of the motor with respect to the ground or supporting surface. When the motor is in position on the apparatus, it can then be tipped to a desired horizontal position substantially parallel with the truck bed or the like, with the lower end of the motor extending outward from the vehicle. The motor is then rotated effectively 180° so that the lower end now extends toward the front of the vehicle. The motor lower end is then removably secured to the carriage of the apparatus. The apparatus carrying the motor is then translated toward the front of the vehicle until the motor head is positioned inside the pickup bed or the like. Locking means is provided to lock the apparatus in both its extended and stowed positions, to lock the engine position with respect to the apparatus and to lock the rotation of the motor in a selected position between an apparatus perpendicular and an apparatus parallel position.

The foregoing and other objects will best be understood from the following description, read in connection with the drawings of a preferred embodiment of the invention, in which:

BRIEF DESCRIPTION OF THE DRAWINGS

FIG. 1A is a partial side view of the motor handling device showing its relative location within a pickup truck bed, a partial cutaway exposes the carriage locking device;

FIG. 1B depicts an enlarged showing of the carriage locking device of FIG. 1A;

FIG. 2 depicts the motor of FIG. 1 in a stored position within a pickup truck bed with the carriage in a stowed position; and FIG. 3 is a perspective showing of the distal end of the carriage mechanism showing the motor mount, carriage transport tracks and the rotational and tilt locking means and motor tie-down in detail.

DETAILED DESCRIPTION OF THE PREFERRED EMBODIMENT

Like reference numerals are used throughout the drawing figures and specifications to denote the same or like part or element.

Referring now to the figures in general, the boat handling and storage apparatus of this invention is generally designated 10. The apparatus is shown mounted on the rear bed 12 inside of bed confines of a pickup truck. The far side 14 of the pickup truck is shown. The rear of the bed includes a "tail gate" 16 which can be pivoted between a closed position shown in FIG. 2 and an open extended position as shown in FIG. 1.

Referring now to the various figures and specifically to FIG. 3, an enlarged detailed view of the boat handling and storage apparatus 10 is shown. The apparatus comprises a translating central spar 18 which is translatably attached by any convenient means, such as bolting, welding, etc. to the pickup bed 12 through a plurality of brackets 20 extending on each side thereof. These brackets 20 support the track means 22 which is also positioned on each side of the spar 18 (the near side shown). It should be understood that brackets 20 and track means 22 may be formed as a single integral unit rather than two separate items. Each longitudinal side of the spar 18 carries a second set of tracks 24. A pair of trucks 26 (one shown) are positioned on each side of the spar 18. The guide wheels 25 of the trucks engage both tracks 22 and 24. The trucks 26 allow the spar 18 to freely translate between a deployed or extended position, see FIG. 1, and a stowed position, see FIG. 2. The trucks support the weight of the motor when attached to the end of the spar and, because the truck translates only half of the distance the spar travels, the tracks 22 need be only one half the length of the required distance travelled by the spar.

At the distal end 28 of the spar 18 carries a motor mount bracket indicated generally as 30. This motor mount bracket 30 attaches to the distal end of the spar 18 by means of an axle 32, in the form of a bolt or the like which passes through an aperture 34, through base member 36 of bracket 30 and aperture 38 through the distal end 28 of the spar 18. The axle is held captive between the countersunk base member surface and the bottom surface of the spar by means of a fastener 39 in the form of a conventional nut which is threaded to the lower end of the axle 32. It should be understood that many other forms of axles and fasteners could be employed to practice this invention.

The motor mount bracket 30 has a lock means 40 attached to the base member 36 to lock the rotational position of the motor mount bracket with respect to the spar 18. The lock means 40 includes a pivotable member 42 pivotally attached to an arm 44, attached to base member 36 by pin 46. A locking pin 48 is attached to pivotable member 42 and passes through the base member 36 for engagement with one of a plurality of apertures 50 passing through the upper surface of the distal end 28 of the spar 18. The number of and location of those apertures 50 is a matter of choice. In the figure, the apertures 50 are shown spaced apart 90° to provide four discrete locking positions of the motor mount bracket 30, a spring 51 positioned between the base member 36, and the pivotal member 42 holds the locking pin 48 in a normally locked position. It should be understood that the locking pin 48 could be a simple detent pin with a grasp ring.

Pivotly attached to the upper surface of the base member 36 through the extensions 52 thereof, is a motor mount block 54 constructed of any suitable material, such as but not limited to, metal, wood, plastic or the like. Pivotally attached to the base member 36 adjacent to motor mount block attachment are a pair of lock arms 56. The lock arms 56 and the motor mount block 54 are pivotly attached to the base member 36 by means of conventional bolt and nut combinations 58 and 60 respectively. The lock arms 56 have an elongated slot 62 positioned centrally along the body thereof. The slot 62 of the lock arms 56 secure the lock arms to the motor mount block 54 by means of wing bolt 64 which threadly engages the motor mount block. The motor mount block internal threads are for attaching the wing bolt (not shown). It should be understood that with the wing bolt loosened in the motor mount block engaging threads, the motor mount block 54 will rotate or pivot along the direction of arrow 64 the length of slot 62 and at any location therealong the motor mounting block travel, it may be locked in location by means of tightening the wing bolts.

On the spar 18, intermediate its ends, is a tie-down bracket 66 shown having a "V" cross-sectional configuration. It should be understood that any convenient cross-sectional configuration to satisfy the intent of the bracket may be used to practice this invention. A strap 68 is attached to the bracket 66 and is used in conjunction with the bracket 66 to secure the lower end of the engine to the boat handling and storage apparatus 10. A buckle 70 is shown to secure the open ends of the strap 68 securely together. It should be understood that any convenient fastening means could be used in place of the buckle 70. The fasteners 70 could be straps constructed of velcro or the like. A pair of steadying members 57 (one shown in FIG. 2) constructed of a block of lubricious material, a leaf spring or the like are positioned on the upper outer surface of both of the tracks 22 to aid in the lateral support of the motor while in transit.

A spar translation locking means, shown in FIGS. 1A and 1B is provided which locks the spar in a selected extended or deployed position (FIG. 1) and a stowed position (FIG. 2). The locking means prevents undesirable longitudinal translation of the spar during motor loading or storing.

Referring now specifically to FIGS. 1A and 2, the motor loading and storing sequence is as follows:

The motor is removed from the boat (not shown) and its mounting jaws 74 are slipped over the engine mounting block 54 in a perpendicular maximum forward and downwardly rotated position. The engine mounting block 54 has been locked in its depicted position prior to attaching the motor thereto. The position of the motor mount assembly 30 is generally substantially lateral with the engine mount of the boat. This feature enables this person or persons handling the motor to merely disengage the motor from the boat turn and attach the motor to the mount 30 without the need of substantial lifting or lowering of the motor.

After the motor is secured to the motor mounting block 54, the block rotational lock bolt 64 is loosened to allow the block 54 to rotate upward. The lower end of the engine is then grasped and rotated about the block 54 pivots to a position substantially parallel with the spar 18 (see FIG. 2). The block 54 is then locked in its FIG. 2 position. The lower end of the engine is now extended outwardly away from the front of the pickup (not shown).

Pivotal member 42 is then depressed downward toward the base member 36 against the bias of spring 51 so that the locking pin 48 is translated upward out of the its engaging aperture 50, allowing the motor mount assembly 30 to rotate in either direction (whichever is convenient). The motor is now turned approximately 180° to its FIG. 2 position. The motor is then strapped in place by means of bracket 66 and strap means 68. The release of pivotable member 42 allows the lock pin to engage the opposed locking aperture 50.

The end 74 of the locking rod 72 is pushed inward in the direction of arrow 75 against the bias of spring 76, releasing the locking pawl 78 from end 79 of spar 18, which allows the spar 18 to translate to its stowed FIG. 2 position. Locking pawl 81 engages notch 82 on the end 28 of spar 18, which prevents undesired translation of the spar from its FIG. 2 stowed position. The pickup truck "tail gate" 16 is then rotated to a closed position and the pickup can now proceed to its destination with the motor safely stored.

It should be understood that, to again put the motor to use on a boat, a reverse procedure is performed.

The structural and functional characteristics of the preferred form of the invention put forth are those that are considered important from the standpoint of simplicity of design, ease of use, and economy of construction. Other advantages and features of the invention, together with various modifications in construction, will undoubtedly occur to those skilled in the art. It is not desired that the invention be limited to the precise details of construction and use disclosed.

What is claimed is:

1. A vehicle mounted handling and storing apparatus for an outboard motor comprising:
   a single telescopic spar support means telescopeable along a path substantially parallel to the longitudinal center line of said vehicle between a stowed position wherein the distal end of the single telescope spar means is within the vehicle and deployed position wherein the distal end of the single telescopic spar means extends from said vehicle; and a motor attachment means positioned on the distal end of said single telescopic spar support means, said motor attachment means comprises a base member attached to said single telescopic spar support means and a support member attached to said base member whereby when stored on said apparatus said outboard motor is positioned parallel to said single telescopic spar support means.

2. The invention as defined in claim 1 wherein telescopic said base member is rotatably attached to said single spar support means.

3. The invention as defined in claim 1 wherein said support member is pivotally attached to said base member.

4. The invention as defined in claim 1 wherein said single telescopic spar support means comprises brackets attached to a fixed structure, first track means carried by said brackets, an elongated spar member, second track means carried by said elongated spar member and truck means translatable along both of said track means whereby said elongated spar member translates relative to said brackets and said first track means.

5. The invention as defined in claim 4 wherein said truck means translates approximately one half the distance of said elongated spar member.

6. The invention as defined in claims 1, 2 or 4 wherein a first locking means is provided for locking said single telescopic spar means in a stowed position.

7. The invention as defined in claim 2 wherein said base member rotates through 360°.

8. The invention as defined in claims 2 or 7 wherein said base member further includes second locking means for locking the rotation of said base member at discrete locations.

9. The invention as defined in claim 2 further including locking means for locking the rotation of said base member at four equally spaced discrete locations.

10. The invention as defined in claim 3 further includes a locking means for locking the pivoted position of said support member in a selected location.

11. The invention as defined in claim 1 further including hold-down means for securing said motor to said support means.

12. The invention as defined in claim 1 further including motor steadying means for laterally steadying said outboard motor when said support means is in said stowed position.

* * * * *